United States Patent [19]
Green

[11] 3,913,535
[45] Oct. 21, 1975

[54] INTERNAL COMBUSTION ROTARY ENGINE OXIDIZING FLUID INJECTION ARRANGEMENT

[75] Inventor: Raymond J. Green, Northville, Mich.

[73] Assignee: General Motors Corporation, Detroit, Mich.

[22] Filed: Aug. 17, 1973

[21] Appl. No.: 389,112

[52] U.S. Cl. ............. 123/8.45; 60/304; 60/901
[51] Int. Cl.² ................. F02B 53/00; F01N 3/10
[58] Field of Search ....... 123/8.45, 26; 60/304, 305, 60/306, 317, 321, 900, 901

[56] References Cited
UNITED STATES PATENTS 3,486,326  12/1969  Hermes et al. ............... 60/901 X
3,507,261  4/1970  Myers et al. ................. 60/901 X FOREIGN PATENTS OR APPLICATIONS
1,804,829  5/1970  Germany ........................ 60/901

*Primary Examiner*—C. J. Husar
*Assistant Examiner*—Michael Koczo, Jr.
*Attorney, Agent, or Firm*—Ronald L. Phillips

[57] ABSTRACT

An internal combustion rotary engine oxidizing fluid injection arrangement having a nozzle that is mounted on the engine's exhaust manifold and locates in a recess in the exhaust passage wall in the engine's rotor housing out of the path of the exhaust gas with this recess having a curved section that deflects oxidizing fluid from the nozzle into the exhaust gas in a direction transverse thereto.

3 Claims, 3 Drawing Figures

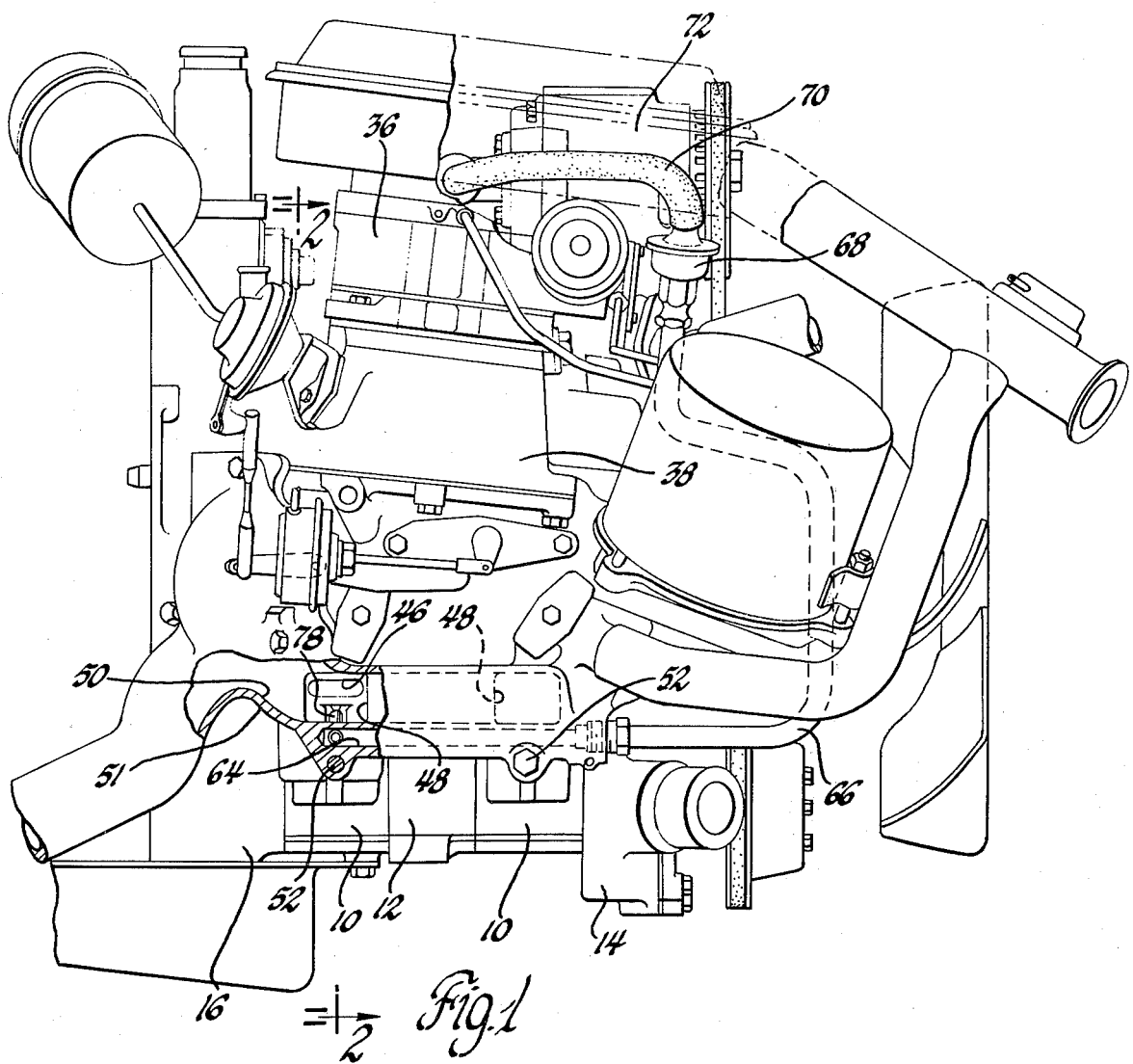

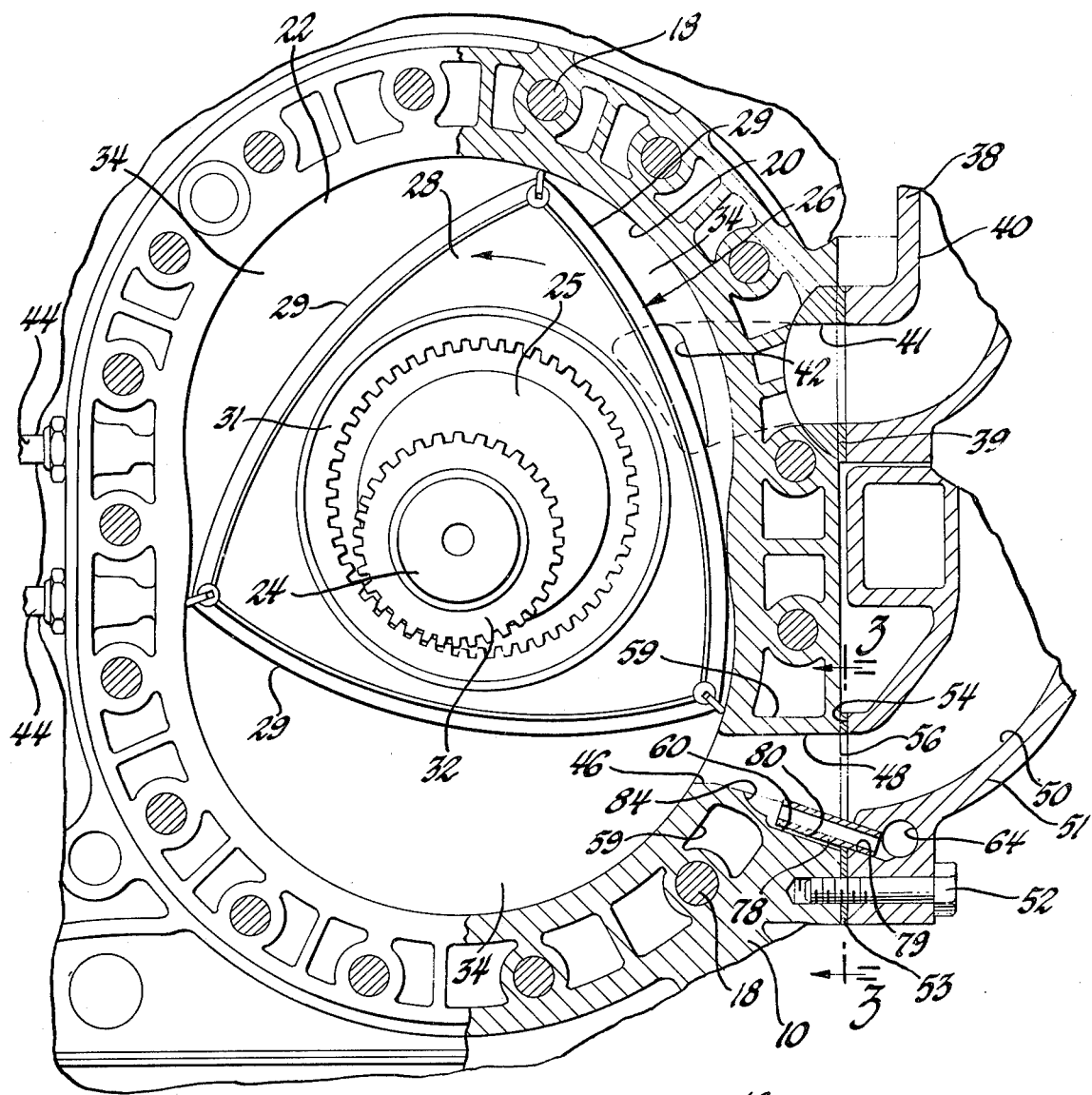

INTERNAL COMBUSTION ROTARY ENGINE OXIDIZING FLUID INJECTION ARRANGEMENT

This invention relates to an internal combustion rotary engine oxidizing fluid injection arrangement and more particularly to such an arrangement wherein a nozzle providing the oxidizing fluid injection is located so as not to experience the full heat of the exhaust gas.

In internal combustion rotary engines, as in internal combustion reciprocating engines, oxidizing fluid such as air can be injected into the exhaust gas to promote burning of partially burned and unburned compounds and also to promote oxidation of undesirable constituents to effect reduction in undesirable emissions. Typically, in reciprocating piston engines the oxidizing fluid is introduced through a nozzle adjacent the downstream side of each exhaust valve where the temperature is sufficiently high so that further combustion can occur spontaneously. In rotary engines, however, the exhaust temperatures are normally considerably higher and there is no exhaust shielding available for the nozzle from an exhaust valve as in a reciprocating piston engine. From an engineering and manufacturing standpoint, it is desirable that the early injection nevertheless be accomplished without requiring higher temperature resistance properties for the nozzle or complicated engine modifications and methods of assembly.

An object of the present invention is to provide a new and improved oxidizing fluid injection arrangement for internal combustion rotary engines providing injection in the engine's internal exhaust passage immediately downstream of the exhaust port without the injection arrangement experiencing the full heat of the exhaust gas.

Another object is to provide in an internal combustion rotary engine an oxidizing fluid injection arrangement having an injection nozzle mounted on the engine's exhaust manifold and projecting into a recessed portion of the engine's exhaust passage wall without projecting into either the exhaust passage or the exhaust manifold's passage so that the injection nozzle is located out of the path of the exhaust gas and does not experience the full heat thereof.

Another object is to provide in an internal combustion rotary engine an oxidizing fluid injection arrangement having an injection nozzle mounted on the engine's exhaust manifold and extending into a recess in the engine's exhaust passage wall with the recess having a curved section for directing oxidizing fluid from the nozzle into the exhaust passage in a direction transverse thereto while the nozzle is located out of the path of the exhaust gas and does not experience the full heat thereof.

These and other objects of the present invention will be more apparent from the following description and drawing in which:

FIG. 1 is an exhaust-side elevational view of an internal combustion rotary engine having an oxidizing fluid injection arrangement according to the present invention.

FIG. 2 is an enlarged view taken along the line 2—2 in FIG. 1.

FIG. 3 is an enlarged view taken along the line 3—3 in FIG. 2.

The oxidizing fluid injection arrangement according to the present invention is readily suited for the presently commercial type internal combustion rotary engine shown in FIGS. 1 and 2 which generally comprises in the case of a two-rotor engine a stationary body having a pair of identical rotor housings 10, an intermediate housing 12, a front housing 14 and a rear housing 16 which are all secured together by bolts 18. Each of the rotor housings 10 has a two-lobed internal peripheral wall 20 as shown in FIG. 2 and there are provided oppositely facing end walls 22 on the interfaces of the intermediate housing 12 and the front housing 14 in one case and the intermediate housing 12 and the rear housing 16 in the other case that cooperate with the respective peripheral walls to define a pair of cavities. A crankshaft 24 is rotatably mounted near its opposite ends in the front and rear housings 14 and 16 and has eccentrics 25 located in the respective cavities, these eccentrics being angularly spaced 180° apart. A three-apex rotor 26 is rotatably mounted on each eccentric 25 and has two parallel sides 28 opposite the respective end walls and three peripheral faces 29 opposite the respective peripheral wall. Each rotor 26 has an internal tooth gear 31 on one side whose center is on the rotor axis and meshes with an annular external tooth gear 32 which is freely received about and concentric with the crankshaft and is secured to the engine's stationary body, the stationary gear 32 for the front rotor being secured to the front housing 14 and the other stationary gear 32 on the rear rotor being secured to the rear housing 16. The internal tooth rotor gears 31 have one and one-half times the number of teeth as the stationary gears 32 with the result that the rotors and the crankshaft turn in a fixed speed relationship while the rotors planetate with a fixed relationship to the rotor housing with the rotors turning at one-third the speed of the crankshaft and the rotors phased 60° apart. The rotor faces 29 and the housing walls 20 and 22 cooperate to provide three working chambers 34 that are spaced about and move with the respective rotors within the respective rotor housings while varying in volume as the rotors planetate, there being provided suitable gas seals on the rotors as shown in FIG. 2 to seal these chambers from each other.

Describing now the induction system, a carburetor 36 delivers a combustible air-fuel mixture to an intake manifold 38. The intake manifold 38 is bolted or clamped to the intermediate and end housings 12, 14 and 16 with a gasket 39 between the interfaces and has internal passages 40 which communicate with intake passages 41 in the intermediate and end housings, the intake passages 41 terminating in side intake ports 42 that are located opposite each other in the respective end walls. Upon rotor rotation in the direction indicated by the arrow in FIG. 2, the air-fuel mixture is sequentially, periodically admitted to the working chambers 34 as they are expanding by the traversing motion of the rotor sides relative to the intake ports whereafter the chambers then close to their intake ports and contract to compress the thus trapped mixture in readiness for ignition. Combustion by spark ignition is provided by an ignition system which has two spark plugs 44 mounted in each of the rotor housings to ignite the mixture in each chamber. Sequential ignition of the air-fuel mixture in the chambers is effected by the spark plugs receiving timed ignition pulses from a distributor, not shown, which is driven by the crankshaft 24. The electrodes of the spark plugs are open to the chambers through the rotor housing's internal peripheral wall 20 and are peripherally spaced thereabout so that one plug is said to lead the other, the spark plugs being fired according to certain engine operating conditions as is well known. With combustion, the peripheral wall takes the reaction to force the rotor to continue rotating and eventually each working chamber following the power phase is exhausted during the exhaust phase through an exhaust port 46 to a diverging exhaust passage 48 defined by an internal passage wall in the respective rotor housing. Each exhaust passage 48 then directs the exhaust gas to a passage 50 in an exhaust manifold 51 that is secured by bolts 52 to the rotor housings 10 with a gasket 53 between the respective interfaces 54 and 56. As shown in FIGS. 1 and 2, the exhaust passage 48 in the rotor housings is rectangularly shaped with rounded corners as viewed in cross-section and projects generally radially outward of the rotor housing and has axial flow coolant passages 59 on both sides.

The engine structure thus far described is conventional and injection of oxidizing fluid such as air is normally provided by injecting the air directly into the exhaust manifold passage 50 downstream of the exhaust passage 48 in the rotor housing. However, according to the present invention there is provided an oxidizing fluid injection arrangement wherein oxidizing fluid such as air is injected into the rotor housing exhaust passage 48 close to or adjacent the exhaust port 46 and in a direction transverse to the flow of the exhaust gas. According to the present invention, the lower portion of the exhaust passage wall 48 in each of the rotor housings is provided with a recessed portion 60 that is centrally located and extends longitudinally of the exhaust passage with its outer end opening through the rotor housing's external surface 56 and it inner end close to or adjacent the exhaust port 46, the relative dimensions in the embodiment shown having the recess extending about two-thirds the length of the exhaust passage so that it is then only one-third the length of the exhaust passage away from the exhaust port. The exhaust manifold 51 is provided with a drilled hole or passage 64 which extends longitudinally thereof on the lower side so as to span the exhaust passages in the two rotor housings and is connected at its open end through a pipe 66, a check valve 68 and a hose 70 to an engine driven air pump 72 as shown in FIG. 1. An injection nozzle in the form of a uniform-thickness constant-diameter metal tube or pipe 78 is press-fitted in a drilled hole 79 through the interface 54 of the exhaust manifold in a position so as to project past the rotor housing's external surface or interface 56 and be fully received in the exhaust passage recess 60 without projecting into either the exhaust passage 48 in the rotor housing or the exhaust manifold passage 50 as shown in FIG. 2. As best shown in FIG. 3, the bottom of the recess 60 is curved in cross-section to conform to the nozzle 78 and is spaced to leave a substantially constant clearance 80 therebetween to prevent interference during assembly while minimizing the intrusion of the recess into the lower portion of the exhaust passage wall and thus the intrusion into the lower coolant passage 59. The nozzle 78 is open at one end through the hole 79 to receive air from the passage 64 and at the other end opens to the recess at a location near the inner end thereof. The recess 60 at its inner end has an arcuate section 84 opposite the outlet end of the nozzle 78 that turns in the direction of the exhaust passage 48 so that as air is pumped through the nozzle it impinges on this curved section and is deflected into the exhaust gas passing through the exhaust passage 48 prior to entry of the exhaust gas into the exhaust manifold 51. The curvature of the deflecting section 84 of the recess directs this air transverse to the passing gas just after exiting the exhaust port 46 to thereby promote good and early mixing so that spontaneous combustion can occur early in the exhaust passage near the exhaust port 46 and thereafter continue into the exhaust manifold 51. Furthermore, with the injection nozzle 78 located fully in the recess 60 so that it is out of the path of the exhaust gas, the nozzle does not experience the full heat of the passing exhaust gas with the result that the material of the nozzle can have lower temperature resistance requirements than if it were exposed to the full heat of the exhaust gas. In addition, by the cooperation between the arcuate deflecting section 84 of the recess and the straight-through nozzle 78 there is provided by very simple structure a desirable injection direction transverse of the exhaust gas flow without requiring a nozzle location in the rotor housing or in the other housing that would interfere with supply of coolant around the exhaust passage, the coolant flow as shown in FIG. 2 being relatively unaffected by the particular arrangement according to the present invention. There is a further advantage in that the deepest part of groove 60 terminates adjacent the end of nozzle 78 so that if the nozzle becomes loose because of thermal distortion of the manifold the nozzle is restrained from leaving the manifold by the step formed between the groove 60 and the curved recess portion 84.

The above described embodiment is illustrative of the present invention which may be modified within the scope of the appended claims.

I claim:

1. An internal combustion rotary engine having a stationary body comprising a rotor housing having a multi-lobed internal peripheral wall and a pair of end wall housings having oppositely facing internal end walls cooperatively defining a cavity, a crankshaft rotatably mounted in said stationary body having an eccentric located in said cavity, a multi-apex rotor rotatably mounted on said eccentric having sides opposite said end walls and a plurality of peripheral faces opposite said peripheral wall, means for causing said rotor and said crankshaft to turn in a fixed speed relationship while said rotor planetates with a fixed relationship to said rotor housing, said rotor faces and housing walls cooperating to provide a plurality of working chambers that are spaced about and move with said rotor within said rotor housing while varying in volume as said rotor planetates, said stationary body having an intake passage that is opened by said rotor to said chambers as they expand to deliver gas thereto, said rotor housing having an internal exhaust passage wall defining an exhaust passage that at one end is opened by said rotor to said chambers during their contraction to receive exhaust gas therefrom and at the other end terminates at an external interface on said rotor housing, an exhaust manifold secured to said stationary body with an interface opposite said rotor housing interface, said exhaust manifold having a manifold passage registering with said exhaust passage in said rotor housing, an oxidizing fluid passage in said exhaust manifold for receiving oxidizing fluid under pressure, said internal exhaust passage wall having a recessed elongated wall portion defining an elongated recess extending through said rotor housing interface from an open outer end at said other end of said exhaust passage to a closed inner end at an intermediate point along the length of said exhaust passage, an elongated injection nozzle secured to said exhaust manifold in a position on said exhaust manifold interface so as to project past said rotor housing interface and be fully received along its length in said elongated recess without projecting into either said exhaust passage or said manifold passage, said injection nozzle open at one end in said exhaust manifold to receive oxidizing fluid from said oxidizing fluid passage and at the other end open to said closed inner end of said elongated recess, and said recessed elongated wall portion at said closed inner end having a curved section opposite said other end of said injection nozzle for directing oxidizing fluid from said injection nozzle into said exhaust passage in a direction transverse thereto whereby said injection nozzle is located out of the path of the exhaust gas and does not experience the full heat thereof.

2. An internal combustion rotary engine having a stationary body comprising a rotor housing having a multi-lobed internal peripheral wall and a pair of end wall housings having oppositely facing internal end walls cooperatively defining a cavity, a crankshaft rotatably mounted in said stationary body having an eccentric located in said cavity, a multi-apex rotor rotatably mounted on said eccentric having sides opposite said end walls and a plurality of peripheral faces opposite said peripheral wall, means for causing said rotor and said crankshaft to turn in a fixed speed relationship while said rotor planetates with a fixed relationship to said rotor housing, said rotor faces and housing walls cooperating to provide a plurality of working chambers that are spaced about and move with said rotor within said rotor housing while varying in volume as said rotor planetates, said stationary body having an intake passage that is opened by said rotor to said chambers as they expand to deliver gas thereto, said rotor housing having an internal exhaust passage wall defining an exhaust passage that at one end is opened by said rotor to said chambers during their contraction to receive exhaust gas therefrom and at the other end terminates at an external interface on said rotor housing, an exhaust manifold secured to said stationary body with an interface opposite said rotor housing interface, said exhaust manifold having a manifold passage registering with said exhaust passage in said rotor housing, an oxidizing fluid passage in said exhaust manifold for receiving oxidizing fluid under pressure, said internal exhaust passage wall having a recessed elongated wall portion defining an elongated recess extending through said rotor housing interface from an open outer end at said other end of said exhaust passage to a closed inner end at an intermediate point along the length of said exhaust passage, a straight tube injection nozzle secured to said exhaust manifold in a position on said exhaust manifold interface so as to project past said rotor housing interface and be fully received with substantial clearance in said elongated recess without projecting into either said exhaust passage or said manifold passage, said injection nozzle open at one end in said exhaust manifold to receive oxidizing fluid from said oxidizing fluid passage and at the other end open to said closed inner end of said elongated recess, and said recessed elongated wall portion at said closed inner end having a curved section extending longitudinally of said exhaust passage opposite said other end of said injection nozzle for directing oxidizing fluid from said injection nozzle into said exhaust passage in a direction transverse thereto whereby said injection nozzle is located out of the path of the exhaust gas and does not experience the full heat thereof.

3. An internal combustion rotary engine having a stationary body comprising a rotor housing having a multi-lobed internal peripheral wall and a pair of end wall housings having oppositely facing internal end walls cooperatively defining a cavity, a crankshaft rotatably mounted in said stationary body having an eccentric located in said cavity, a multi-apex rotor rotatably mounted on said eccentric having sides opposite said end walls and a plurality of peripheral faces opposite said peripheral wall, means for causing said rotor and said crankshaft to turn in a fixed speed relationship while said rotor planetates with a fixed relationship to said rotor housing, said rotor faces and housing walls cooperating to provide a plurality of working chambers that are spaced about and move with said rotor within said rotor housing while varying in volume as said rotor planetates, said stationary body having an intake passage that is opened by said rotor to said chambers as they expand to deliver gas thereto, said rotor housing having a liquid cooled internal exhaust passage wall defining an exhaust passage that at one end has an exhaust port that is opened by said rotor to said chambers during their contraction to receive exhaust gas therefrom and at the other end terminates at an external interface on said rotor housing, an exhaust manifold secured to said stationary body with an interface opposite said rotor housing interface, said exhaust manifold having a manifold passage registering with said exhaust passage in said rotor housing, an oxidizing fluid passage in said exhaust manifold for receiving oxidizing fluid under pressure, said internal exhaust passage wall having a recessed elongated wall portion extending longitudinally of said exhaust passage defining an elongated recess extending through said rotor housing interface from an open outer end at said other end of said exhaust passage to a closed inner end adjacent said exhaust port, a straight tube injection nozzle having uniform thickness and constant diameter secured to said exhaust manifold in a position on said exhaust manifold interface so as to project past said rotor housing interface and be fully received with substantial clearance in said elongated recess without projecting into either said exhaust passage or said manifold passage, said injection nozzle open at one end in said exhaust manifold to receive oxidizing fluid from said oxidizing fluid passage and at the other end open to said closed inner end of said elongated recess, and said recessed elongated wall portion at said closed inner end adjacent said exhaust port having a curved section opposite said other end of said injection nozzle turned in the direction of said exhaust passage for directing oxidizing fluid from said injection nozzle into said exhaust passage adjacent said exhaust port in a direction transverse thereto whereby said injection nozzle is located in a zone bordered by said liquid cooled wall but is out of the path of the exhaust gas and does not experience the full heat thereof.

* * * * *